United States Patent
Sankur

(10) Patent No.: US 6,301,051 B1
(45) Date of Patent: Oct. 9, 2001

(54) HIGH FILL-FACTOR MICROLENS ARRAY AND FABRICATION METHOD

(75) Inventor: Haluk O. Sankur, Ventura, CA (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/543,077

(22) Filed: Apr. 5, 2000

(51) Int. Cl.⁷ .......................... G02B 27/10; G03B 21/60
(52) U.S. Cl. ............................ 359/626; 359/455
(58) Field of Search ..................... 359/619, 621, 359/622, 626, 455, 542; 65/23, 37, 60.8

(56) References Cited

U.S. PATENT DOCUMENTS

| | | | | |
|---|---|---|---|---|
| 5,620,814 | * | 4/1997 | Kely ................................ | 430/5 |
| 5,864,381 | * | 1/1999 | Neal et al. ...................... | 351/205 |
| 6,107,000 | * | 8/2000 | Lee et al. ....................... | 430/296 |

OTHER PUBLICATIONS

Zoran D. Popovic, et al., Technique For Monolithic Fabrication Of Mocrlens Arrays, Applied Optics, Apr. 1988, vol. 27, No. 7, pp. 1281–1282.

Walter Dascher, et al., Cost–Effective Mass Fabrication Of Multilevel Diffractive Optical Elements By Use Of A Single Optical Exposure With A Gray–Scale Mask On High–Energy Beam–Sensitive Glass, Applied Optics, Jul. 10, 1997, vol. 36, No. 20, pp. 4675–4680.

Fleming, Madeleine B., et al., Blazed Diffractive Optics, Applied Optics, Jul. 10, 1997, vol. 36, No. 20, pp. 4635–4643.

Hebs–Glass Photomask Blanks A Single All–Glass Phototool Replaces Five Binary Chrome Masks For 3D Shaping, CMI Product Information No. 96–01 User's Manual, pp. 1–15.

Hebs–Glass Photomask Blanks, One Step Fabrication Of A True Gray Level Mask, CMI Product Information No. 96–18.

Hebs–Glass Photomask Blanks, User's Manual, pp. 1–11, Graphs, Revised Mar. 1, 1996.

\* cited by examiner

*Primary Examiner*—Georgia Epps
*Assistant Examiner*—Saeed Seyrafi
(74) *Attorney, Agent, or Firm*—Koppel & Jacobs

(57) ABSTRACT

A transparent, refracting material is disposed atop an optoelectronic substrate device. Such refracting material has formed therein a plurality of microlenses arranged in a regular, tessellated pattern, which is superimposable on a regular tiling pattern of polygonal cells, attached to one another at defining polygonal borders. The contours of the refractive microlens' surface have rotational symmetry within each cell about an axis, with the symmetric contour maintaining its symmetry substantially at every surface point within the cell's borders. The microlens surface is fabricated by printing a contour into a photoresist using grey scale photolithography, then transferring the contour into an underlying refractive planarizing material, suitably by ion etching. The method produces a microlens array in which each microlens maintains its symmetric contour substantially across a polygonal cell, thus achieving almost unity fill factor without significant aberrations.

21 Claims, 4 Drawing Sheets

HIGH FILL-FACTOR MICROLENS ARRAY AND FABRICATION METHOD

BACKGROUND OF THE INVENTION

1. Field of the Invention

This invention relates to integrated optoelectronics in general and more specifically to monolithic microlens arrays for photodetector imagers.

2. Description of the Related Art

Optoelectronic arrays such as photodetector imagers are commonly combined with complementary arrays of microlenses to enhance efficiency by concentrating incident radiation into an active photodetecting region. Various techniques have been employed to fabricate the microlens arrays. In some methods, a microlens array is fabricated separately from the photoelectronic chip then bonded to the chip. This requires that the microlens array be aligned properly with the photoelectronic chip during bonding, and that the alignment be accurately maintained during the life of the device. Because such alignment is difficult in mass-production, monolithic fabrication of microlens arrays integrated with the optoelectronics is preferable.

One conventional method of monolithic fabrication of microlens arrays is described by Zoran D. Popovic, Robert A. Sprague, and G. A. Neville Connell in "Technique for Monolithic Fabrication of Microlens Arrays, " *Applied Optics*, Vol. 27, No. 7, pp. 1281–84 (April 1988). Briefly, their method consists of four steps: first, aluminum film is deposited on a quartz substrate and patterned with 15 micron circular aperture holes. Second, 30 micron circular pedestals are formed on top of the holes. Next, 25 micron diameter, 12 micron high cylinders of photoresist are developed on top of the pedestals. Finally, heating to 140 degrees centigrade melts the pedestals which then form roughly hemispherical droplets, under the influence of surface tension. The formation of hemispherical droplets is analogous to the familiar way in which rain droplets "bead up" on the hood of freshly waxed automobiles.

The above described fabrication method has several drawbacks. First, it fails to approach a 100 percent fill factor for the surface area. Second, when a non-circular lens base is used, the method produces imperfect lens shapes which deviate from spherical, resulting in broadened focal spots.

A further problem is the sensitivity of the reflow method to process conditions. Interfacial adhesion and wetting of the photoresist over the planarizing material are process dependent, and it is therefore difficult to achieve reproducible results. Photoresist lenses for visible imagers are typically fabricated on an optically transparent planarizing layer or over color filters. The lens, filter and planarizing materials have similar surface energies, which makes controlling the wetting and spreading of the photoresist during reflow difficult to control. A narrow range of process conditions must be maintained for success.

The reflow fabrication method is undesirably limited in its ability to produce "slow" microlenses (with small aperture to focal length ratio). Such microlenses have only slight curvature over their aperture, and it is difficult to accurately produce such a shape, as the surface tension causes the edges to rise and the center to sag. Any such sag introduces significant aberration.

Reworking of imperfect reflow microlenses is expensive as it requires stripping of the lens, the planarization layer and any underlying color filter materials (which are commonly added).

The failure of reflow lenses to achieve high fill factor can be easily understood by reference to FIG. 1. The figure shows only four pixels, for ease of illustration, although actual image matrices typically would include hundreds, thousands, or even millions of pixels, as is well known. The pixels are typically laid out substantially as shown, in a rectangular or square matrix with rows 10 and columns 12 at right angles. The round regions 14 represent the microlenses, formed by the reflow method, which occupy area within rectangular cells 16 (shown square, within phantom lines 17). A minimum space 18 is required between the circumference of the microlenses 14 and any adjacent microlenses. If this minimum space is not observed, the lenses 14 will flow together during melting to form larger drops, losing their distinct identities.

In the plan illustrated, it is obvious that each microlens is, in area plan, a round object occupying a square cell. Therefore, even neglecting interlens spacing, full fill-factor can never be achieved, as the area of a circle of diameter d is only $\pi/4$ of the area of the square enclosing the circle. The situation worsens when the requisite inter-lens spacing is considered; and the fill-factor degrades to an abysmal level as the lenslets are scaled down below ten microns, as the interlens spacing is not correspondingly scaleable: a minimum spacing is required between the lenses to prevent contact of photoresist islands during reflow, and this spacing is generally limited by the photolithographic resolution. With reflow lenses, a typical fill factor of less than 65 percent is achievable for 5 micron square pixel sizes with 1 micron separation.

To increase fill factor, it would be desirable to fabricate arrays of microlenses in which each microlens approximates a polygonal segment of a spherical contour, and the polygonal microlenses are placed contiguously in a tiling pattern to cover the receptive area, for example in a rectangular or square matrix. However, the reflow method cannot fabricate microlenses which have square or otherwise polygonal borders. Consider a pillar of photoresist, which is allowed to melt and reflow to accomodate a non-circular aperture (shown as a square, projecting onto abcd) as shown in FIG. 2. The resulting microlens 20 is non-spherical (and in fact, not rotationally symmetrical about its central axis L). The lozenge-like lenslet has been twice cut and a pie-like wedge removed, to clearly show the curvature of the surface in two different planes. The first cutaway 22 is taken parallel to the square side of the lenslet; the second cutaway 24 is in a plane slicing diagonally across the square aperture, corner to corner.

If the lozenge-like microlens of FIG. 2 is formed by droplet reflow, the surface tension of the reflow droplet will form the microlens surface in a minimum-surface form (constrained by the shape of the square aperture border). Unfortunately, the minimum surface formed by wetting a polygonal aperture is emphatically not a segment of a sphere. This is easily seen in FIG. 2: the arc 28 which bounds section 22 descends from the zenith z to the side of the lozenge 20, with elevation h. The arc 30, makes the same descent, but over a longer run, necessarily longer because the diagonal of a square is always longer than it width. This is not characteristic of a spherical surface (or even a surface with rotational symmetry about a central axis at z). Thus, surface tension does not permit formation of droplets of polygonal borders with spherical surfaces. Aspherical aberrations caused by the square (or generally, polygonal) borders degrade the performance of reflow microlenses in polygonal apertures, by broadening the focal region.

SUMMARY OF THE INVENTION

In view of the above problems, the present invention is a refractive microlens array with improved fill-factor, suitable for integral fabrication on an optoelectronic substrate device, and a method of fabricating the microlens array.

An optically transparent, refracting material is disposed atop the opto-electronic substrate device. Such refracting material has formed therein a plurality of microlenses arranged in a regular, tessellated pattern, which is superimposable on a regular tiling pattern of polygonal cells, attached to one another at defining polygonal borders. The contours of the refractive microlens' surface have rotational symmetry within each cell about an axis, with the symmetric contour maintaining its symmetry substantially at every surface point within the cell's closed polygonal border, thereby substantially covering the cell with a usable, symmetric lens surface (most preferably a partial spherical surface).

The method of fabrication for the microlens arrays includes several steps: First, a substrate is coated with a transparent planarizing material. Next, a layer of photoresist is deposited on top of the planarizing material. A thickness contour is then printed into the photoresist by grey-scale photolithography. Preferably, a high-resolution grey-scale mask is used, which can be prepared by writing with a high energy e-beam into High Energy Beam Sensitive glass (HEBS glass). Finally, the thickness contours of the photoresist are transferred into the planarizing material by ion etching, thereby producing an array of refractive lenses in the planarizing material. The method can produce a spherical microlens array in which each microlens in the array maintains its spherical contour substantially across the entire surface, border to border, thus achieving almost unity fill factor, without introducing significant aberrations.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
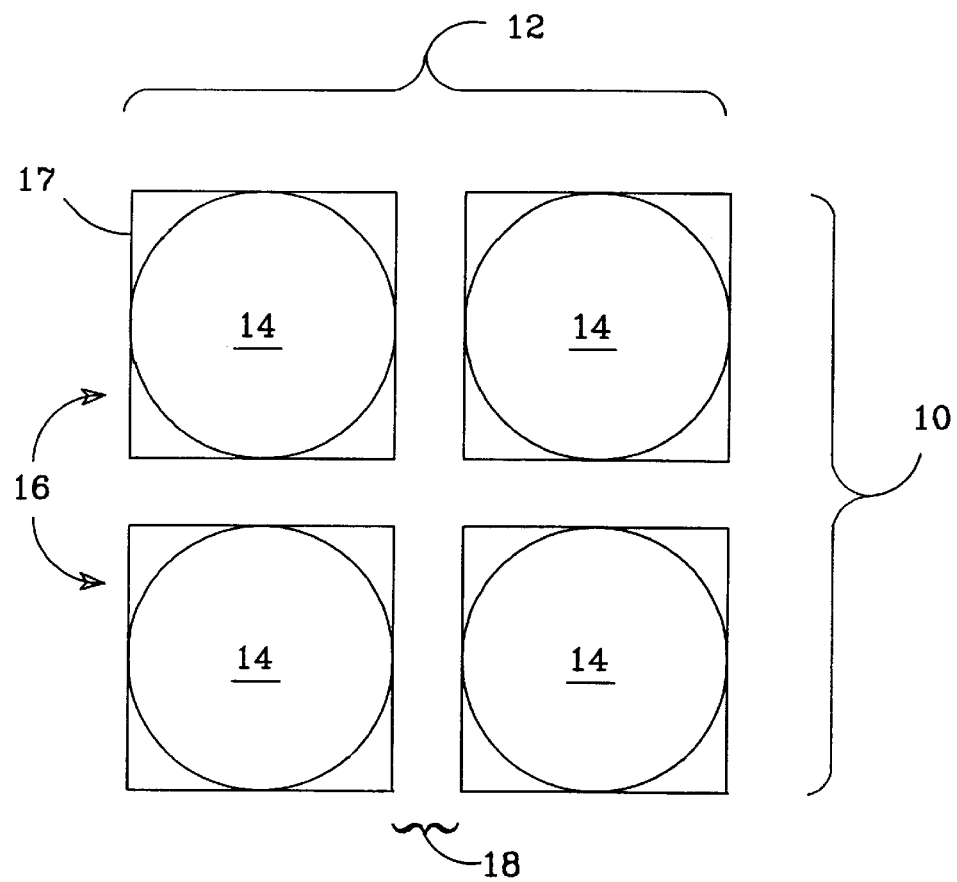
FIG. 1 is a plan view of a prior art microlens array pattern.
Figure 2:
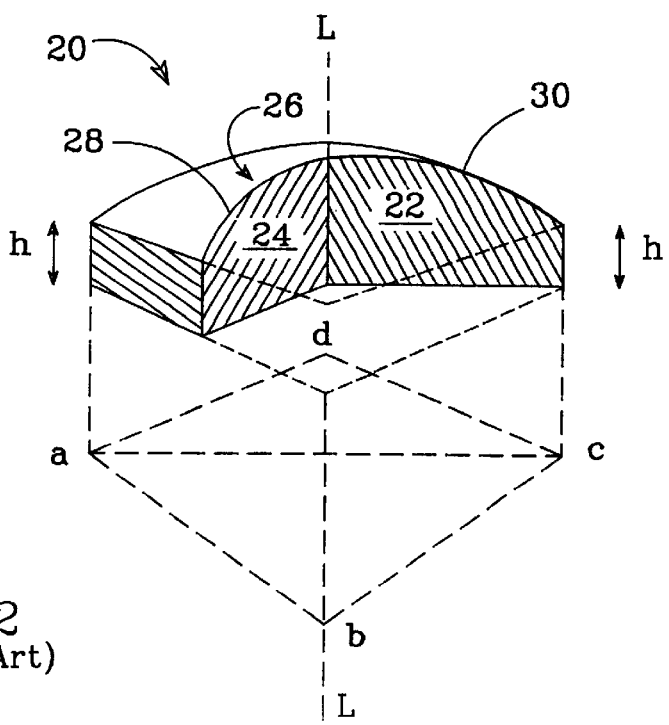
FIG. 2 is a perspective view of a microlens fabricated by prior art methods, with a wedge cut away to reveal cross-sections in two different planes.

The geometry of a typical microlens in accordance with the invention is shown in FIG. 2, as it would appear if cut apart from its neighboring microlenses (in an array). (The figure is based upon atomic force microscopic mapping of a typical microlens fabricated by the method of the invention.) Geometrically, the microlens 40 typically has an approximately spherical surface 42 which substantially covers a polygonal cell (here shown as a square, for example only and not by way of limitation). The dimensions given are typical. The materials and composition of the microlenses are discussed below, in connection with the preferred method of fabrication.

It should be emphasized the surface of the microlens 40 approximates spherical for other surface of revolution, discussed below), substantially across the entire area of a rectangular cell (projecting onto abcd, as shown). This causes the surface 42 to appear to dip deeper into the corners, as at 46, while less dip is apparent at the side mid-points (as at 28). This of course is a necessary consequence of the fact that the diagonal is always longer than either side of a rectangle. Therefore, the diagonals traverse a longer angle than the sides, including more arc of the spherical surface 42.

Figure 3:
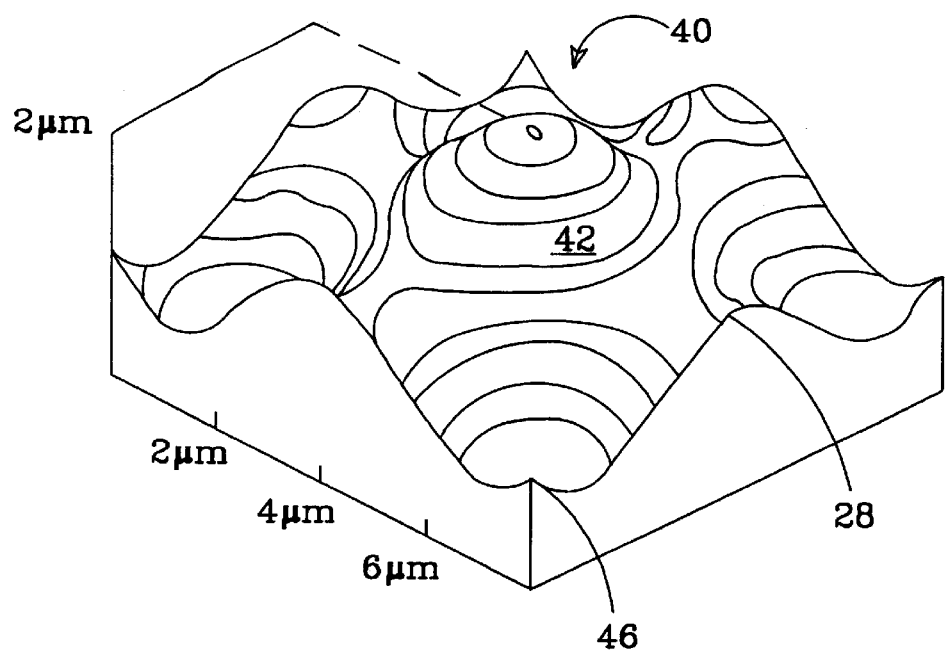
FIG. 3 is a perspective view of a microlens in accordance with the invention, with topographic lines to illustrate surface contour.

FIG. 3 shows an array of refractive microlenses in accordance with the invention. (A simplistically small array is shown for clarity of illustration). A rectangular array is shown, but other regular tiling patterns of substantially polygonal cells can also be used in accordance with the invention. Dimensions shown are typical. Greater or lesser radii of curvature could be fabricated according to the desired focal lengths.

Figure 5:
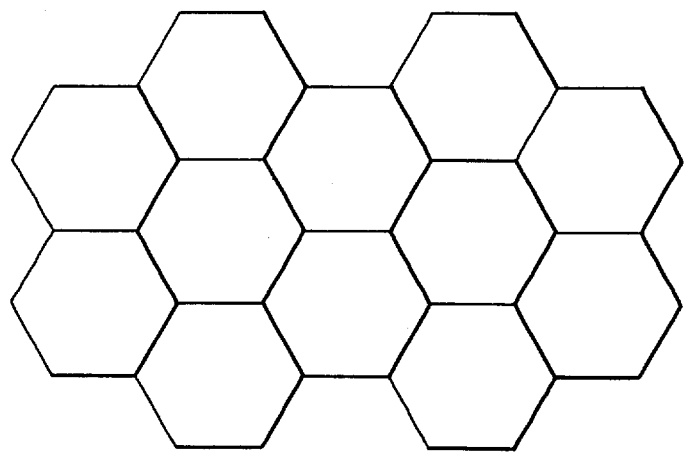
FIG. 5 is a plan view of one exemplary alternate tiling pattern which can be used to arrange microlenses into an array in accordance with the invention.

The invention is to limited to spherical microlenses, but includes aspherical lenlets, especially those having regular surfaces generated by revolution of a generatrix about a central axis. For example, parabolic or elliptical surfaces of revolution could be fabricated. The polygons which circumscribe the microlenses are not limited to rectangular, but could be any suitable polygon. For example, hexagonal cells can be advantageously fabricated in the familiar honeycomb-like regular grid, as shown in FIG. 5, which produces excellent pixel densities.

Figure 6A:
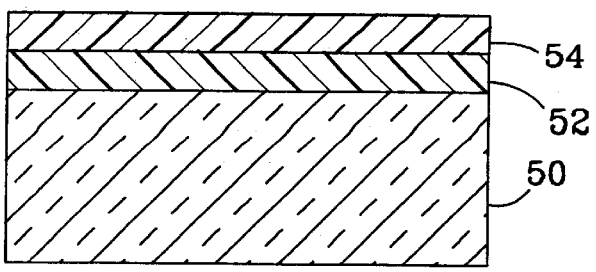
FIGS. 6a–6e are sequential sectional views of a fabrication sequence in accordance with the method of the invention for fabricating microlens arrays.

The microlenses are preferably fabricated directly on top of an integrated optoelectronic circuit (such as a CMOS imaging matrix) by a novel, gray-scale fabrication process. As shown in FIG. 6a, the microlens fabrication preferably starts with a fabricated integrated circuit, shown here and referred to simply as a "substrate" 50. (notwithstanding that the chip may have complex fabricated circuits, it is merely a substrate in relation to the microlens fabrication). The substrate 50 is first coated with a planarization material 52, which is suitably made of an acrylic polymer material transparent to the radiation of interest. The planarization material 52 may be suitably applied by spin coating to a thickness of 1–2 microns then heating to a temperature of 200 degrees C. for a period of 30 minutes to planarize the material. A conventional photoresist 54 is then applied to an approximate thickness of 1–3 microns on top of the planarization material, suitably by spin-coating.

Figure 6B:
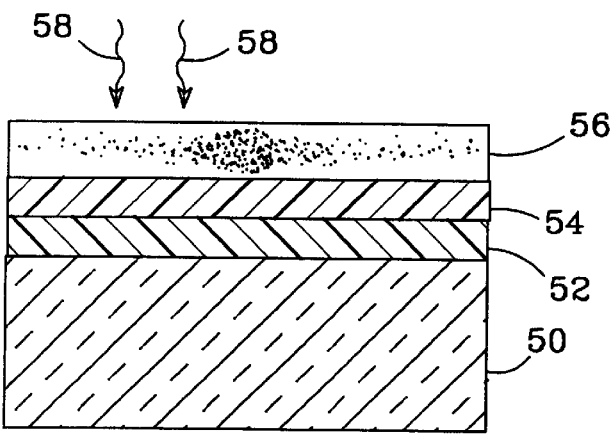

As shown in FIG. 6b, a grey scale patterned mask 56 is then placed directly atop the photoresist 54 and exposed to ultraviolet light 58 filtered through the grey scale patterned mask. This process step is similar to the more familiar photomasking steps in conventional IC processing, except that it employs grey scale rather than simple black/white masking. The mask 56, discussed in greater detail below, is fabricated with a grey-scale absorption profile, here represented by graduated stippling, according to a profile calculated to produce a desired microlens elevation contour.

Figure 6C:
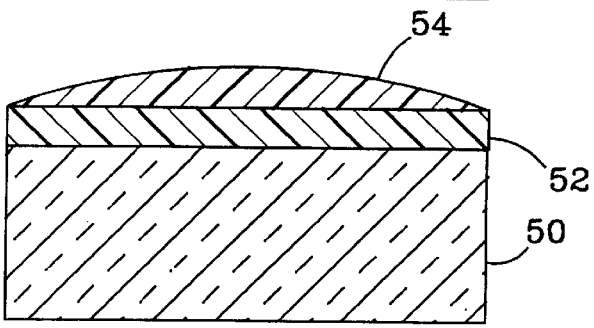

After exposure the unexposed photoresist is removed by washing. More accurately, the photoresist is removed to a greater or lesser degree in relation to the amount of light exposure it received in the preceding exposure step of FIG. 6b. The result, shown in FIG. 6c, is that the remaining photoresist 54 is formed into contoured islands of elevation varying in relation to the light exposure received in the previous step (FIG. 6b). Specifically, for a spherically countoured microlens, islands such as 54 are formed with contours approximating a spherical surface.

Figure 6D:
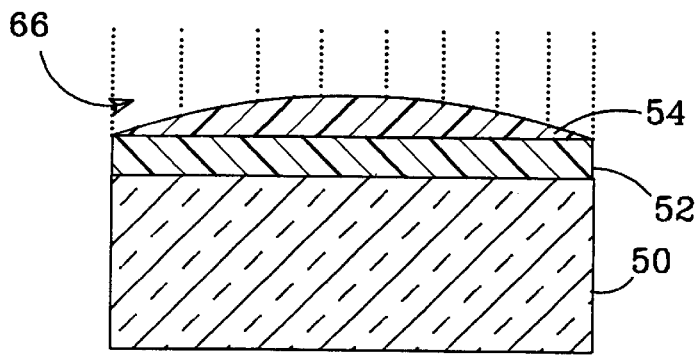
Figure 6E:
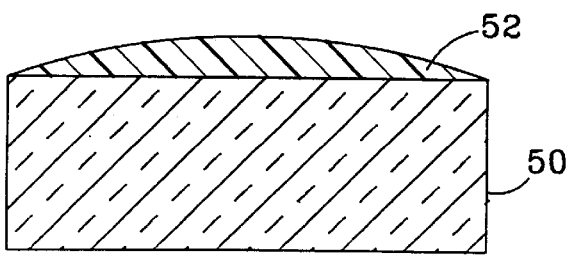

Next, in the step illustrated by FIG. 6d, the upper surface 54 is subjected to a milling technique such as reactive ion etching, symbolized by ions 66, which erodes the planarizing layer differentially, in inverse relation to the thickness of the photoresist layer 54 at each point on the surface. This transfers the contours in the photoresist (which is environmentally unstable) into the planarizing layer 52 (preferably a more environmentally stable material). The contours can be suitably transferred, for example, by reactive ion etching for approximately ten minutes in an $O_2$ and $SF_6$ ambient environment at approximately 20 milliTorr pressure at 20 degrees C. The result, after etching, is shown in FIG. 6e: microlens 52 of the desired contour has been fabricated in a planarizing material 52 on top of a substrate 50 (which preferably includes complex optoelectronic and/or interface circuitry, not shown).

The method described requires a very finely modulated, grey-scale mask to differentially expose the photoresist according to the lenslet contour desired (in contrast to more conventional masking, which uses a simple black/white mask). Grey-scale masks suitable for use in the method can be fabricated from high energy beam sensitive ("HEBS") glasses. Such glasses have optical density values which vary as a function of e-beam dosage, and can therefore be "written" or spatially modulated as desired by exposure to a modulated e-beam, for example in the 15–30 kV energy range. A grey level mask is thereby obtained with a continuous tone even when observed at the highest level of magnification. The optical density (OD) values obtained typically vary from 0.1 to 1.2 (on a logarithmic scale, where T is the transmission and $OD=\log_{10} 1/T$). The exposure curves typically have a substantial linear portion which is most conveniently utilized. The glass produces a very continuous grey scale because the coloring elements are specks of silver of approximately 10 nm dimensions. Thus the exposed glass has no discernible graininess and is capable of less than 0.25 micron resolution. HEBS glass photomask blanks are commercially available, for example from Canyon Materials, Inc. in San Diego, Calif. The technical details of how such HEBS glasses can be written, for example by a raster-scanning e-beam pattern generator, are given in the CMI (Canyon Materials, Inc.) Product Information publications No. 96-01 (user's Manual) and 96-18.

Figure 4:
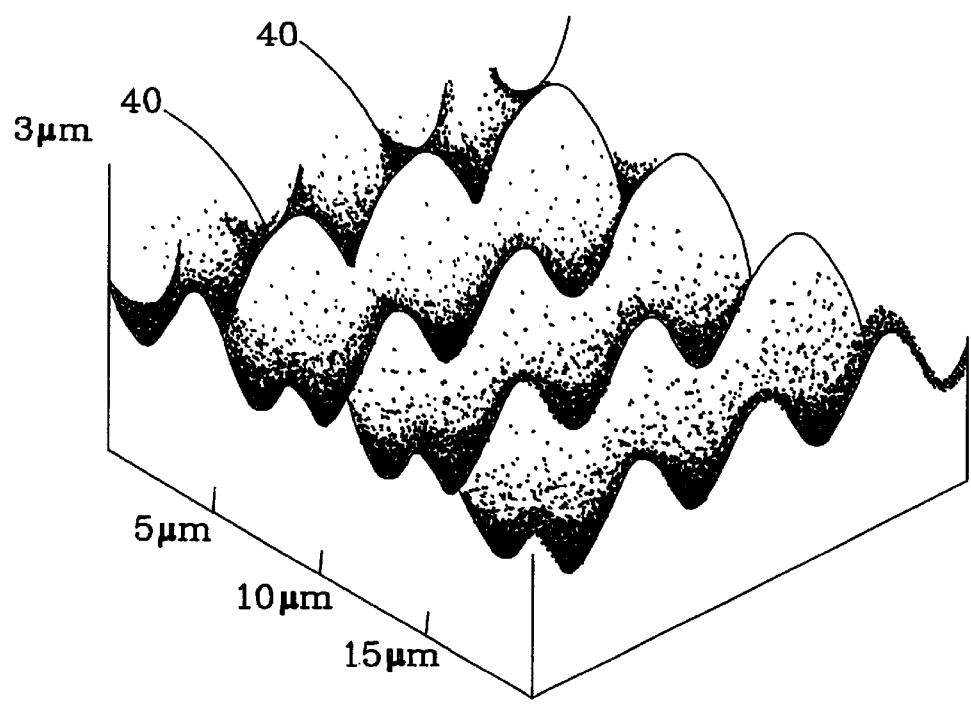
FIG. 4 is an array of microlenses in accordance with the invention, laid out in an exemplary square tiling pattern.

The above described method produces superior microlens arrays in several respects. First, it allows fabrication of arrays of tiled, contiguous polygonal lenslets in which each lenslet is substantially spherical in contour over substantially all of the cell surface, notwithstanding that the borders between lenslets follow a regular polygonal pattern (See FIG. 4, above). No substantial inter-cell spacing is required. This achieves an approximate 100 percent fill factor, regardless of lens size or speed (aperture relative to focal length). A typical microlens array in accordance with the invention includes a plurality of microlenses, arranged with a center to center pitch of approximately ten microns or less, with refractive material of between 1 and 3 microns in thickness (before etching).

A further advantage of the method is that the microlenses are fabricated in the same material as the planarization layer, and do not rely on photoresist wetting and interfacial adhesion, as in prior methods. In such prior methods, because the microlens shape was highly dependent upon uniform wetting and interfacial adhesion, inconsistencies in wetting often produced inconsistent microlenses. The grey scale lithographic method of the present invention avoids reliance on such poorly controlled interface variables and achieves more consistent results. In particular, it is impossible for lens droplets to accidentally flow together during fabrication, so they can be laid out without substantial loss of aperture to any minimum spacing requirement.

Critical photoresist bleaching and surface conditioning process steps, necessary in prior fabrication methods, are eliminated in the present method, resulting in savings in time and increased reproducibility.

Figure 7A:
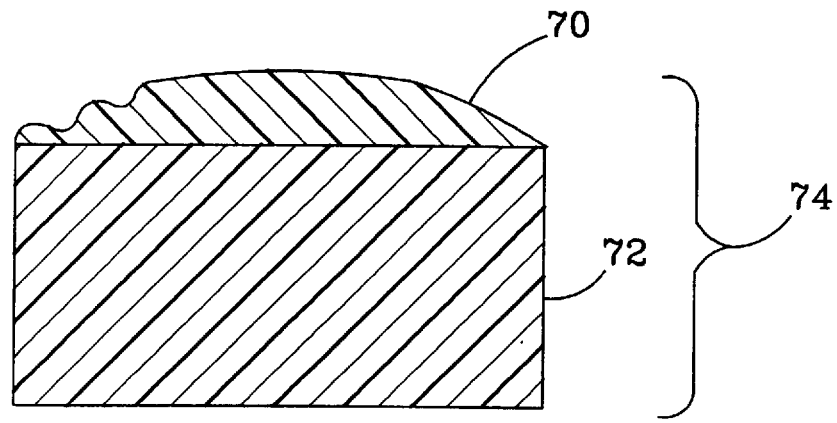
FIGS. 7a–7b are sequential sectional views of an a variant fabrication sequence, which can be used to rework microlens arrays by the method of the invention.
Figure 7B:
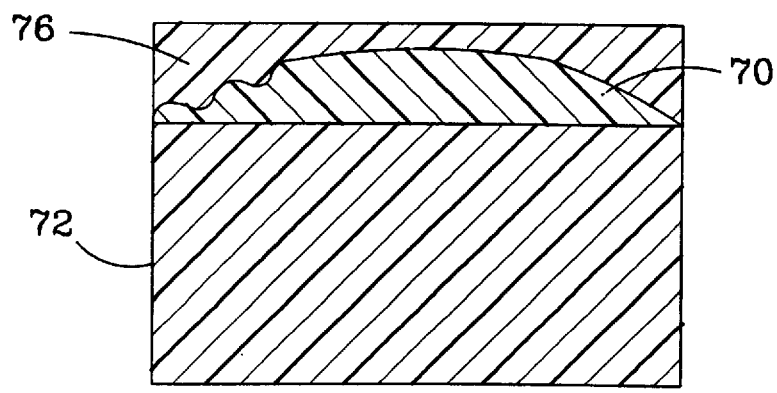

Yet another advantage is that the method of the invention can be employed, with minor variation, to rework a completed but flawed array of microlenses, in an efficient and cost-effective process. As an example, a flawed microlens (part of a flawed array) is illustrated in FIG. 7a. A flawed microlens 70 has been fabricated in planarizing material on top of a substrate 72. To rework the device 74, a layer of planarization material 76 is added, suitably by spin coating to a thickness of approximately 1–3 microns. After heating, the old and new planarization essentially flow together, with the added planarizing material filling in any gaps and resulting in a planar surface as shown in FIG. 7b. After replanarization, a photoresist coating is applied, and the result is essentially the blank as shown in FIG. 6a, above. The process steps already described in connection with FIGS. 6a–6e are then repeated to rework the array.

The ability to rework chip-microlens assemblies as described results in significant savings, particularly in applications in which the "substrate" (50 in FIG. 6a) includes complex integrated electronics such as CMOS photodetector readout electronics.

It should be emphasized that the microlenses fabricated according to the invention are refractive microlenses, which should not be confused with diffractive optical elements (DOEs). Refractive optical elements are superior to DOEs in most applications, because they are capable of operation over wide spectral range, and with incoherent light sources. Furthermore, refractive elements typically have higher transmission efficiency than similar diffractive elements.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of fabricating a refractive microlens, suitable for integrating said microlens on a substrate, which substrate can include a monolithic opto-electronic integrated circuit, comprising the steps of:

coating the substrate with a planarizing material;

depositing a layer of photoresist on top of said planarizing material;

printing a thickness contour in the photoresist by grey-scale photolithography;

transferring the thickness contour of said photoresist into the planarizing material by ion etching, thereby producing refractive lens in the planarizing material.

2. The method of claim 1, wherein the planarizing material comprises an organic polymer.

3. The method of claim 2, wherein the planarizing material comprises a polyacrylate.

4. The method of claim 1, wherein the step of printing a thickness contour comprises:

exposing said photoresist layer to photons filtered through a grey scale modulated mask;

washing said photoresist layer to remove photoresist to a spatially varying degree across the layer, the degree of removal varying from point-to-point in relation to a varying degree of photo exposure from said exposing step, leaving a thickness contour in said photoresist corresponding to a pre-determined lens contour.

5. The method of claim 4, wherein said grey scale modulated mask comprises a high energy electron-beam sensitive glass, written by e-beam exposure according to a grey scale modulation pattern which corresponds to a pre-determined lens contour.

6. The method of claim 1, wherein at least one area of said thickness contour comprises a surface with rotational symmetry about a central axis through said area, said area corresponding to a microlens.

7. The method of claim 6, wherein said thickness contour is substantially a portion of a spherical surface, bounded by a polygonal border.

8. The method of claim 6, wherein said thickness contour further comprises an array of said microlenses.

9. A refractive microlens array, suitable for integral fabrication on an opto-electronic substrate device, comprising:

an optically transparent, refracting material, disposed atop the opto-electronic substrate device;

said refracting material having a plurality of cells arranged in a regular, tiling pattern, said pattern superimposable on a regular pattern of polygonal cells attached to one another at defining polygonal borders;

said refracting material having a contoured surface, the contours of which have rotational symmetry within the borders of a cell, with the rotationally symmetric contour maintaining its symmetry substantially at every surface point within the cell's closed polygonal border, thereby substantially covering the cell with a symmetric lens surface.

10. The microlens array of claim 9, wherein said rotationally symmetric contour within said cell follows a section of a spherical surface, the limits of which surface are circumscribed by said polygonal border of said cell.

11. The microlens array of claim 10, wherein said polygonal borders describe a rectangular cells, and said pattern is a regular rectangular tiling pattern.

12. The microlens array of claim 11 wherein said polygonal borders describe square cells.

13. The microlens array of claim 10, wherein said polygonal borders describe hexagonal cells.

14. The microlens array of claim 9, wherein said refractive material comprises a polymer.

15. The microlens array of claim 14, wherein said polymer comprises polyacrylate.

16. The microlens array of claim 15, wherein said refractive material is between 1 and 3 microns in thickness, and said cells are arranged with less than 10 micron pitch.

17. The microlens array of claim 9, wherein said microlens array is contoured to focus substantially all of the incident light, thereby attaining a fill factor of substantially unity.

18. The microlens array of claim 9, wherein said contours of said refractive material are formed by:

depositing a layer of photoresist on top of said refractive material;

printing a thickness contour in the photoresist by grey-scale photolithography;

transferring the thickness contour of said photoresist into the planarizing material by ion etching, thereby producing a refractive lens in the planarizing material.

19. The microlens array of claim 18, wherein said grey scale lithography comprises the steps of:

exposing said photoresist layer to photons filtered through a grey scale modulated mask;

washing said photoresist layer to remove photoresist to a spatially varying degree across the layer, the degree of removal in relation to the varying degree of photoexposure from said exposing step, leaving a thickness contour in said photoresist corresponding to a pre-determined lens contour;

and wherein said grey scale modulated mask comprises a high energy electron beam sensitive glass, written by e-beam exposure according to a grey scale modulation pattern which corresponds to a pre-determined lens contour.

20. A method of fabricating a refractive microlens array, suitable for fabricating an array of refractive microlenses on a substrate, which substrate can include a monolithic opto-electronic integrated circuit, comprising the steps of:

coating the substrate with a planarizing material;

depositing a layer of photoresist on top of said planarizing material;

writing a grey-scale modulated pattern into a grey-scale mask, by exposing a high energy e-beam sensitive glass to an e-beam, modulated according to a grey scale modulation pattern which corresponds to a pre-determined lens contour;

exposing said photoresist layer to photons filtered through said grey scale mask;

washing said photoresist layer to remove photoresist to a spatially varying degree across the layer, the degree of removal varying in relation to the varying degree of photo exposure from said exposing step, leaving a thickness contour in said photoresist corresponding to said pre-determined lens contour;

transferring the thickness contour of said photoresist into the planarizing material by ion etching, thereby producing a refractive microlens array in the planarizing material.

21. The method of claim 20, wherein said planarizing material comprises polyacrylate.

* * * * *